(12) United States Patent
Kwak et al.

(10) Patent No.: US 9,730,170 B2
(45) Date of Patent: Aug. 8, 2017

(54) CONNECTION TO ACCESS POINT

(71) Applicant: EMPIRE TECHNOLOGY DEVELOPMENT LLC, Wilmington, DE (US)

(72) Inventors: Jin Sam Kwak, Uiwang-si (KR); Hyun oh Oh, Gwacheon-si (KR); Ju Hyung Son, Uiwang-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 24 days.

(21) Appl. No.: 14/298,973

(22) Filed: Jun. 9, 2014

(65) Prior Publication Data

US 2015/0358944 A1  Dec. 10, 2015

(51) Int. Cl.
*H04W 56/00* (2009.01)
*H04W 48/16* (2009.01)
*H04W 84/12* (2009.01)
*H04W 16/32* (2009.01)
*H04W 36/04* (2009.01)
*H04W 36/16* (2009.01)

(52) U.S. Cl.
CPC .......... *H04W 56/001* (2013.01); *H04W 16/32* (2013.01); *H04W 36/04* (2013.01); *H04W 36/165* (2013.01); *H04W 48/16* (2013.01); *H04W 84/12* (2013.01)

(58) Field of Classification Search
CPC ..... H04W 16/18–16/20; H04W 16/32; H04W 36/04; H04W 36/08; H04W 36/14–36/22; H04W 36/36–36/365
See application file for complete search history.

(56) References Cited

U.S. PATENT DOCUMENTS

| 2008/0062940 | A1  | 3/2008 | Othmer |
| 2014/0066054 | A1* | 3/2014 | Jung ............... H04W 36/14 455/426.1 |
| 2015/0009838 | A1* | 1/2015 | Sun ............... H04W 52/281 370/252 |

(Continued)

OTHER PUBLICATIONS

"5 Emerging Innovations in Carrier Wi-Fi," Alepo, 2012, Accessed on May 28, 2014 at <URL: http://www.alepo.com/papers/emerging-innovations-in-carrier-wi-fi-2012/>, pp. 17.

(Continued)

*Primary Examiner* — Eric Myers
(74) *Attorney, Agent, or Firm* — Turk IP Law, LLC (57) ABSTRACT

Technologies generally described herein relate to connection of a mobile device to an access point in a wireless communication system. Example mobile devices may include a receiver, a decoder and a data communication module. The receiver may be configured to receive a downlink synchronization signal from an access point through a cellular band. In some embodiments, the downlink synchronization signal is synchronized based on a signal from a base station. The decoder may be coupled to the receiver and configured to decode the received downlink synchronization signal to obtain information regarding the access point. The data communication module may be coupled to the decoder and configured to connect to the access point based, at least in part, on the obtained information regarding the access point.

20 Claims, 8 Drawing Sheets

(56) References Cited

U.S. PATENT DOCUMENTS

2015/0055516 A1* 2/2015 Smadi ............... H04W 72/1215
370/280

OTHER PUBLICATIONS

"Access network discovery and selection function," Wikipedia, Jun. 24, 2013, Accessed on May 28, 2014 at <URL: http://web.archive.org/web/20130624110315/http://en.wikipedia.org/wiki/Access_network_discovery_and_selection_function, pp. 4.

"FUJITSU Network BroadOne LTE Femtocell Systems," Fujitsu Global, Accessed on May 28, 2014 at <URL: http://www.fujitsu.com/global/products/network/products/femto/index.html>, pp. 5.

"Wi-Fi Certified Passpoint," WiFi Alliance, Mar 30, 2014, Accessed on May 28, 2014 at <URL: http://web.archive.org/web/20140330232759/http://www.wi-fi.org/discover-wi-fi/wi-fi-certified-passpoint>, pp. 5.

"Wi-Fi Roaming—Building on ANDSF and HOTSPOT2.0," Alcatel-Lucent White Paper in Collaboration with BT, 2012, Accessed on May 28, 2014, pp. 45.

Yuto Nakai et al., "Wi-Fi Access Point Discovery System for Mobile Users," Eighth International Joint Conference on Computer Science and Software Engineering, 2011, pp. 75-79, IEEE.

Monica Paolini, "Carrier Wi-Fi® for mobile operators: A TCO model assessing the cost benefits of Wi-Fi and cellular small-cell joint deployments," Senza Fili Consulting, 2013, pp. 17.

Trevor Pering et al., "CoolSpots: Reducing the Power Consumption of Wireless Mobile Devices with Multiple Radio Interfaces," In Proceedings of the Fourth International Conference on Mobile Systems, Applications, and Services, ACM, Jun. 19-22, 2006, pp. 220-232, Uppsala, Sweden.

Eugene Shih et al., "Wake on Wireless: An Event Driven Energy Saving Strategy for Battery Operated Devices," In Proceedings of the Eighth Annual International Conference on Mobile Computing and Networking, ACM, Sep. 23-26, 2002, pp. 160-171, Atlanta, Georgia, USA.

Feng Xia et al., "A-GPS Assisted Wi-Fi Access Point Discovery on Mobile Devices for Energy Saving," IEEE Global Information Infrastructure Symposium (GIIS 2011), Aug. 4-6, 2011, pp. 1261-1266.

Ruogu Zhou et al., "ZiFi: Wireless LAN Discovery via ZigBee Interference Signatures," In Proceedings of the 16th Annual International Conference on Mobile Computing and Networking, ACM, Sep. 20-24, 2010, pp. 49-60, Chicago, Illinois, USA.

* cited by examiner

CONNECTION TO ACCESS POINT

BACKGROUND

Unless otherwise indicated herein, the approaches described in this section are not prior art to the claims in this application and are not admitted to be prior art by inclusion in this section.

Recently, the demand for data traffic through a cellular network on mobile devices has been increasing. Since capability of the data traffic through the cellular network is limited, data communication through, for example, a wireless fidelity (Wi-Fi) network on the mobile devices may offload the data traffic through the cellular network. In this regard, some common carriers of cellular communication system may also operate Wi-Fi access points (that is, carrier Wi-Fi access points) and may often encourage users of the mobile devices to use the Wi-Fi network instead of the cellular network.

SUMMARY

Technologies generally described herein relate to connection of a mobile device to an access point in a wireless communication system.

Various example mobile devices configured to connect to an access point described herein may include a receiver, a decoder and/or a data communication module. The receiver may be configured to receive a downlink synchronization signal from the access point through a cellular band. The downlink synchronization signal may be synchronized based on a signal from a base station. The decoder may be coupled to the receiver and configured to decode the received downlink synchronization signal to obtain information regarding the access point. The data communication module may be coupled to the decoder and configured to connect to the access point based, at least in part, on the obtained information regarding the access point. The mobile devices may further include a switch coupled to the data communication module and configured to activate the data communication module in response to the obtained information regarding the access point.

In some examples, methods performed under control of a mobile device are described. Example methods may include receiving a downlink synchronization signal from an access point; obtaining information regarding the access point from the received downlink synchronization signal; and/or connecting to the access point based, at least in part, on the obtained information regarding the access point. The obtaining may include detecting a signature from the received downlink synchronization signal and decoding the detected signature to obtain the information regarding the access point.

In some examples, a wireless fidelity (Wi-Fi) access point is described such as any example access point that may be adapted to provide wireless data communication to a mobile device. An example Wi-Fi access point may include a signal generator, a transmitter and/or a wireless network adapter. The signal generator may be configured to generate a downlink synchronization signal. The downlink synchronization signal may include information regarding the Wi-Fi access point. The transmitter may be coupled to the signal generator and configured to transmit, to the mobile device, the generated downlink synchronization signal through a cellular band. The wireless adapter may be coupled to the transmitter and configured to provide a wireless data connection to the mobile device through a Wi-Fi band. The downlink synchronization signal may be synchronized based on a signal from a base station.

In some examples, methods performed under control of a wireless fidelity (Wi-Fi) access point to provide wireless data communication to a mobile device are described. The example methods may include generating a downlink synchronization signal that includes information regarding the Wi-Fi access point; transmitting, to the mobile device, the generated downlink synchronization signal through a cellular band; and providing a wireless data connection to the mobile device through a Wi-Fi band. The example methods may further include synchronizing the generated downlink synchronization signal with a signal from a base station. In some examples, the example methods may further include receiving a probe request signal from the mobile device and transmitting a probe response signal in response to the received probe request signal. In some other examples, the example methods may further include transmitting a beacon signal to the mobile device.

In some examples, a computer-readable storage medium is described that may be adapted to perform the above described example methods.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to connection to an access point.

Briefly stated, technologies are generally described for connecting a mobile device to an access point in a wireless communication system. In various examples, the access point, which may be adapted to provide wireless data communication to the mobile device, may include a signal generator, a transmitter and/or a wireless network adapter. The signal generator may be configured to generate a downlink synchronization signal that may include information regarding the access point. The transmitter may be configured to transmit, to the mobile device, the generated downlink synchronization signal through a cellular band. The mobile device may include a receiver configured to receive the downlink synchronization signal transmitted from the access point through the cellular band. The mobile device may further include a decoder and/or a data communication module. The decoder may be configured to decode the received downlink synchronization signal to obtain the information regarding the access point. The data communication module may be configured to connect to the access point based, at least in part, on the obtained information regarding the access point, and the wireless network adapter of the access point may be configured to provide a wireless data connection to the mobile device through a data communication band, such as, for example, a wireless fidelity (Wi-Fi) band.

Figure 1:
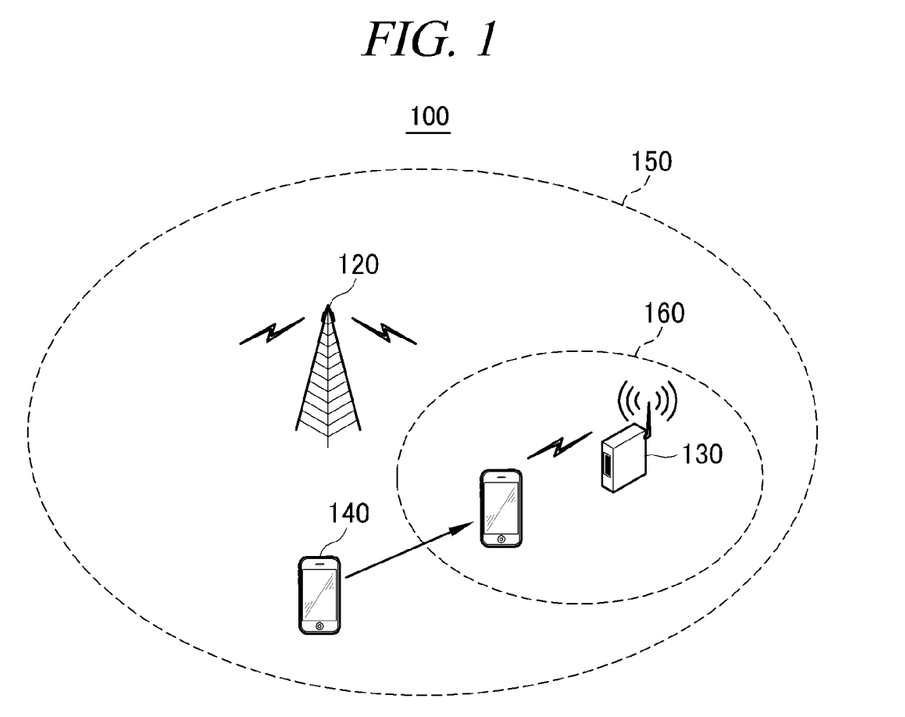
FIG. 1 shows a diagram of an example wireless communication system where a mobile device may be configured to connect to an access point.

FIG. 1 shows a diagram of an example wireless communication system where a mobile device may be configured to connect to an access point, arranged in accordance with at least some embodiments described herein. As depicted, a wireless communication system 100 may include one or more base stations, such as a base station 120, one or more access points, such as an access point 130 and/or one or more mobile devices, such as a mobile device 140. In some embodiments, wireless communication system 100 may be a cellular network system employing any suitable cellular technology including, but not limited to, Global System for Mobile communications (GSM), Code Division Multiple Access (CDMA), Long Term Evolution (LTE), Worldwide Interoperability for Microwave Access (WiMax) technology, and/or others. In some embodiments, base station 120 may be configured to provide voice and/or data communication to mobile device 140 located within a communication range 150. By way of example, base station 120 may include a macro-cell base station (BS), a micro-cell BS, a femto-cell BS, a pico-cell BS, and/or others.

In some embodiments, access point 130 may be configured to generate a downlink (DL) synchronization signal and then transmit, to mobile device 140 located within a communication range 160, the generated DL synchronization signal through a cellular band. The generated DL synchronization signal may include information regarding access point 130. By way of example, the information may include an indication of presence of access point 130 and/or connection information, such as, for example, a service set identifier (SSID), at least one Wi-Fi channel number, ISM and/or UNII band information, a media access control (MAC) address of access point 130, and/or others. In some embodiments, access point 130 may be further configured to synchronize the generated DL synchronization signal with a DL synchronization signal transmitted from base station 120. Mobile device 140 may be able to receive the generated DL synchronization signal with a typical manner of receiving a cellular signal. In some examples, the DL synchronization signal generated by access point 130 may be wirelessly synchronized based on the DL synchronization signal transmitted from base station 120 through the cellular band. In some other examples, the DL synchronization signal generated by access point 130 may be synchronized based on base station 120 through a wired link (not shown in FIG. 1). The DL synchronization signal generated by access point 130 may be periodically or otherwise repeatedly transmitted to mobile device 140.

In some embodiments, access point 130 may be configured to provide wireless data communication to one or more mobile devices, such as mobile device 140, located within communication range 160. By way of example, access point 130 may be a Wi-Fi access point and may be configured to provide wireless data communication at, for example, an industrial, scientific and medical (ISM) band and/or an unlicensed national information infrastructure (UNII) band.

In some embodiments, mobile device 140 may be configured to perform cellular communication with base station 120 as well as wireless data communication with access point 130. In communication range 150 outside of communication range 160, mobile device 140 may only be able to receive the DL synchronization signal transmitted from base station 120 through the cellular band. Mobile device 140 may obtain information regarding base station 120, such as a cell identification (ID), from the received DL synchronization signal, and then establish a cellular connection with base station 120 based on the obtained information. As depicted in FIG. 1, when mobile device 140 moves into communication range 160, mobile device 140 may receive the DL synchronization signal transmitted from access point 130 as well as the DL synchronization signal transmitted from base station 120 through the cellular band. As will be described in more details below, mobile device 140 may obtain the information regarding access point 130 from the DL synchronization signal transmitted from access point 130. Mobile device 140 may connect to access point 130 based, at least in part, on the obtained information regarding access point 130. In some examples, mobile device 140 may automatically connect to access point 130 for data communication in response to obtaining the information regarding access point 130.

Figure 2:
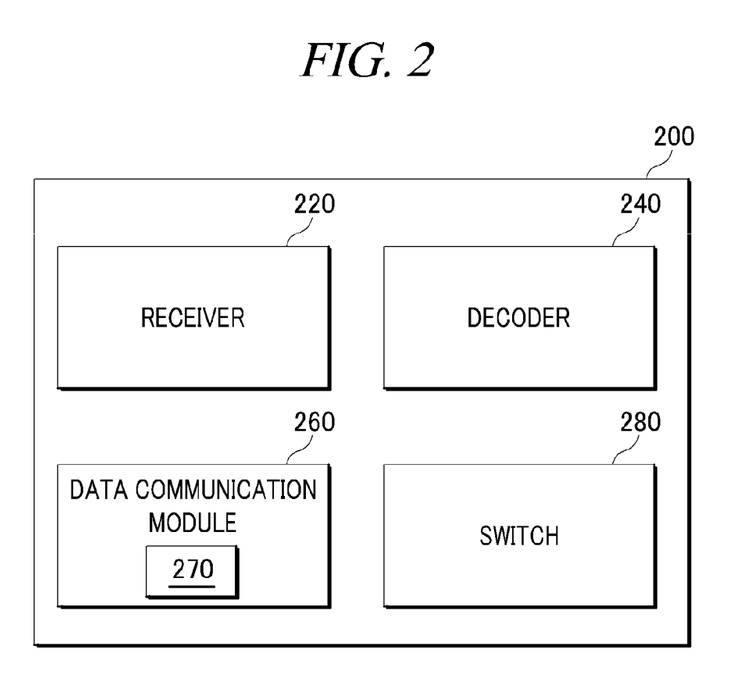
FIG. 2 shows a block diagram of an example mobile device configured to connect to an access point based on a downlink synchronization signal received through a cellular band.

FIG. 2 shows a block diagram of an example mobile device configured to connect to an access point based on a DL synchronization signal received through a cellular band, arranged in accordance with at least some embodiments described herein. As illustrated, a mobile device 200 may include a receiver 220, a decoder 240, a data communication module 260, and/or a switch 280, operatively coupled to each other or otherwise in communication with each other. In some embodiments, at least some of these elements may be implemented in hardware, software, or a combination of hardware and software. In some embodiments, mobile device 200 may be any suitable type of electronic or computing device, such as, for example, a cellular phone, smart phone, personal digital assistant (PDA) and/or others, which may be equipped with cellular communication capabilities and wireless data communication capabilities. The configuration of mobile device 200 as illustrated in FIG. 2 may be implemented in mobile device 140 shown in FIG. 1.

In some embodiments, receiver 220 may be configured to periodically or otherwise repeatedly receive a DL synchronization signal, which may be transmitted from a base station (such as, for example, base station 120 of FIG. 1), through a cellular band such that mobile device 200 may be synchronized with the base station to establish a cellular connection. Further, receiver 220 may be configured to receive a DL synchronization signal, which may be generated by and transmitted from an access point (such as, for example, access point 130 of FIG. 1), through the cellular band. In some embodiments, the DL synchronization signal transmitted from the access point may have been synchronized based on the DL synchronization signal transmitted from the base station.

In some embodiments, decoder 240 may be coupled to receiver 220 and configured to decode the DL synchronization signal transmitted from the access point to obtain information regarding the access point. In some embodiments, decoder 240 may be configured to detect a signature from the DL synchronization signal transmitted from the access point. In some embodiments, the signature may be included in a portion of the DL synchronization signal transmitted from the access point that corresponds to a cell ID section of the DL synchronization signal transmitted from the base station. Thus, decoder 240 may be able to detect the signature (included in the DL synchronization signal transmitted from the access point) in a similar manner of detecting a cell ID from the DL synchronization signal transmitted from the base station. Decoder 240 may then be configured to decode the detected signature to obtain the information regarding the access point. By way of example, the obtained information may include an indication of presence of the access point and/or connection information, such as, for example, a service set identifier (SSID), at least one Wi-Fi channel number, ISM and/or UNII band information, a media access control (MAC) address of the access point, and/or others.

In some embodiments, data communication module 260 may be coupled to decoder 240 and configured to connect to the access point based, at least in part, on the obtained information regarding the access point. By way of example, the access point may be a Wi-Fi access point and data communication module 260 may further include a Wi-Fi module 270. Wi-Fi module 270 may be configured to operate at a Wi-Fi band including, but not limited to, an ISM band and/or a UNII band. Wi-Fi module 270 may be configured to perform a Wi-Fi scan procedure to connect to the Wi-Fi access point. In some examples, Wi-Fi module 270 may perform an active scan procedure. For example, Wi-Fi module 270 may transmit a probe request signal to the Wi-Fi access point and, in response to the probe request signal, receive a probe response signal from the Wi-Fi access point. In some other examples, Wi-Fi module 270 may perform a passive scan procedure, in which Wi-Fi module 270 may receive a beacon signal transmitted from the Wi-Fi access point.

In some embodiments, when decoder 240 obtains the information regarding the access point, switch 280 may be configured to activate data communication module 260 in response to the obtained information regarding the access point. That is, data communication module 260 may be activated by switch 280 to establish a connection with the access point in response to the obtained information.

Figure 3:
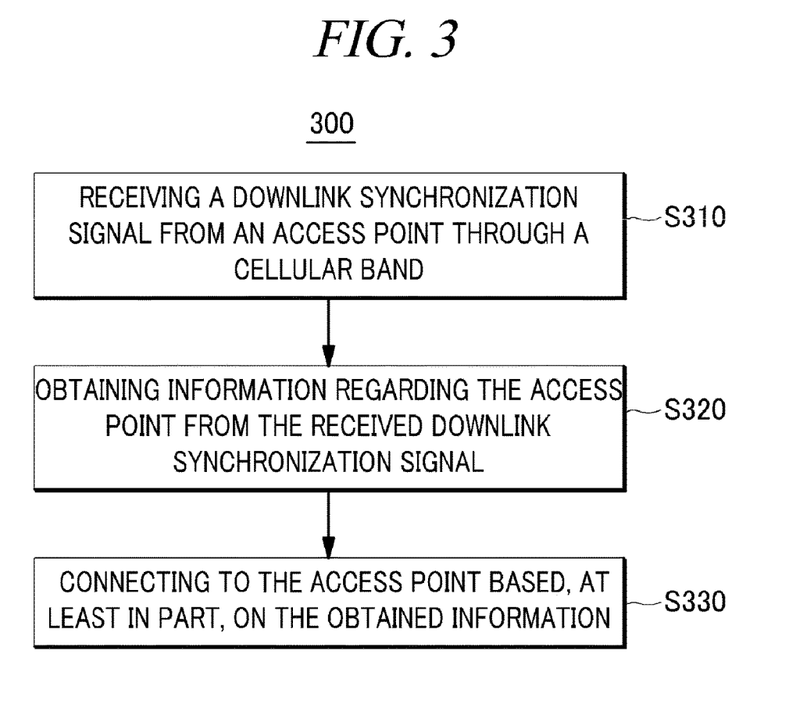
FIG. 3 illustrates an example flow diagram of a method adapted to connect to an access point based on a downlink synchronization signal received through a cellular band in a mobile device.

FIG. 3 illustrates an example flow diagram of a method adapted to connect to an access point based on a DL synchronization signal received through a cellular band in a mobile device, arranged in accordance with at least some embodiments described herein. An example method 300 in FIG. 3 may be implemented using, for example, mobile device 140 described with reference to FIG. 1 and/or mobile device 200 described with reference to FIG. 2.

Method 300 may include one or more operations, actions, or functions as illustrated by one or more of blocks S310, S320, and/or S330. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Method 300 may begin at block S310, "RECEIVING A DOWNLINK SYNCHRONIZATION SIGNAL FROM AN ACCESS POINT THROUGH A CELLULAR BAND."

At block S310, the mobile device (such as, for example, receiver 220 of mobile device 200 in FIG. 2) may receive a DL synchronization signal transmitted from the access point through a cellular band. In some examples, the DL synchronization signal transmitted from the access point may have been synchronized based on a DL synchronization signal transmitted from a base station. By way of example, but not limitation, the access point may be a Wi-Fi access point. Block S310 may be followed by block S320, "OBTAINING INFORMATION REGARDING THE ACCESS POINT FROM THE RECEIVED DOWNLINK SYNCHRONIZATION SIGNAL."

At block S320, the mobile device (such as, for example, decoder 240 of mobile device 200 in FIG. 2) may obtain information regarding the access point from the received DL synchronization signal. In some embodiments, the mobile device may detect a signature from the received DL synchronization signal and decode the detected signature to obtain information regarding the access point. The information regarding the access point may include an indication of presence of the access point and/or connection information, such as, for example, a service set identifier (SSID), at least one Wi-Fi channel number, ISM and/or UNII band information, a media access control (MAC) address of the access point, and/or others. Block S320 may be followed by block S330, "CONNECTING TO THE ACCESS POINT BASED, AT LEAST IN PART, ON THE OBTAINED INFORMATION."

At block S330, the mobile device (such as, for example, data communication module 260 of mobile device 200 in FIG. 2) may connect to the access point based, at least in part, on the obtained information regarding the access point. In some embodiments, data communication module 260 may be activated by switch 280 and then connect to the access point, as described above with reference to FIG. 2. In some examples, the access point may include a Wi-Fi access point and data communication module 260 may include a Wi-Fi module 270, which may operate at an ISM band and/or a UNII band and/or other band(s).

In light of the present disclosure, for this and other methods disclosed herein, the functions and operations performed in the methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

Figure 4:
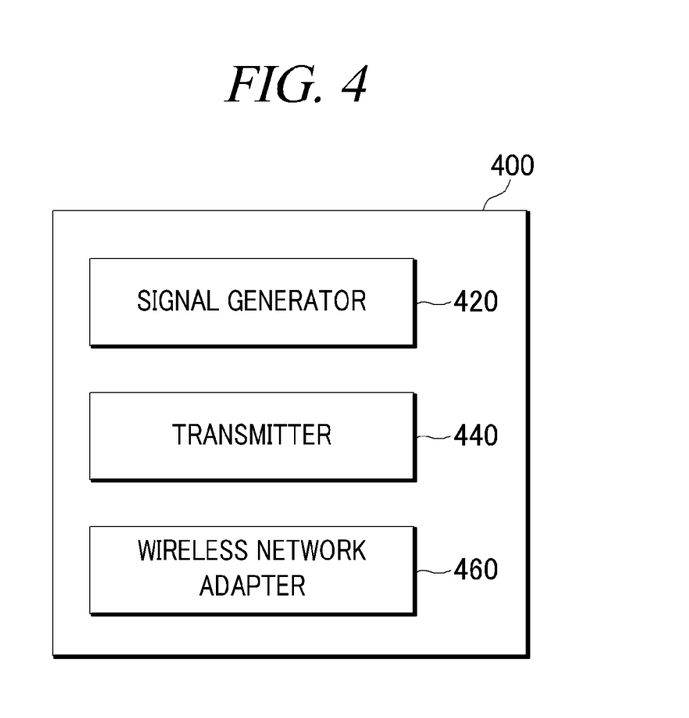
FIG. 4 shows a block diagram of an example access point configured to transmit, to a mobile device, a downlink synchronization signal through a cellular band to provide a wireless data connection to the mobile device.

FIG. 4 shows a block diagram of an example access point configured to transmit, to a mobile device, a DL synchronization signal through a cellular band to provide a wireless data connection to the mobile device, arranged in accordance with at least some embodiments described herein. As illustrated, an access point 400 may include a signal generator 420, a transmitter 440 and/or a wireless network adapter 460 operatively coupled to each other or otherwise in communication with each other. In some embodiments, access point 400 may be any suitable type of access point, such as, for example, a Wi-Fi access point, which is configured to provide wireless data communication to a mobile device. The configuration of access point 400 as illustrated in FIG. 4 may be implemented in access point 130 shown in FIG. 1.

In some embodiments, signal generator 420 may be configured to generate a DL synchronization signal. The DL synchronization signal may include information regarding access point 400. By way of example, the information regarding access point 400 may be configured to enable the mobile device to connect to access point 400 and may include an indication of presence of access point 400 and/or connection information, such as, for example, a MAC address of access point 400, a service set identifier (SSID), information about at least one frequency band for wireless communication, at least one wireless communication channel number of access point 400, and/or others.

In some embodiments, transmitter 440 may be coupled to signal generator 420 and configured to transmit, to the mobile device, the generated DL synchronization signal through a cellular band. The mobile device may receive the DL synchronization signal transmitted from access point 400 through the cellular band. In some embodiments, the DL synchronization signal generated by signal generator 420 may be synchronized based on a base station. In some examples, the DL synchronization signal generated by signal generator 420 may be wirelessly synchronized based on a DL synchronization signal transmitted from the base station through the cellular band. In some other examples, the DL synchronization signal may be synchronized based on the base station through a wired link.

In some embodiments, wireless network adapter 460 may be coupled to transmitter 440 and configured to provide a wireless data connection to the mobile device. In some embodiments, access point 400 may be a Wi-Fi access point, and wireless network adapter 460 may provide the mobile device with a wireless data connection through a Wi-Fi band. By way of example, but not limitation, the Wi-Fi band may include an ISM band and/or a UNII band and/or other band(s). In some examples, wireless network adapter 460 may be configured to perform an active scan procedure. In such examples, when the mobile device receives the DL synchronization signal transmitted from access point 400 through the cellular band, the mobile device may obtain the information regarding access point 400 and transmit a probe request signal to access point 400 based, at least in part, on the information regarding access point 400. Then, wireless network adapter 460 may receive the probe request signal and transmit a probe response signal in response to the received probe request signal. In some other examples, wireless network adapter 460 may be configured to perform a passive scan procedure. In such examples, wireless network adapter 460 may be configured to transmit a beacon signal to the mobile device through a wireless data communication band, such as, for example, a Wi-Fi band.

Figure 5:
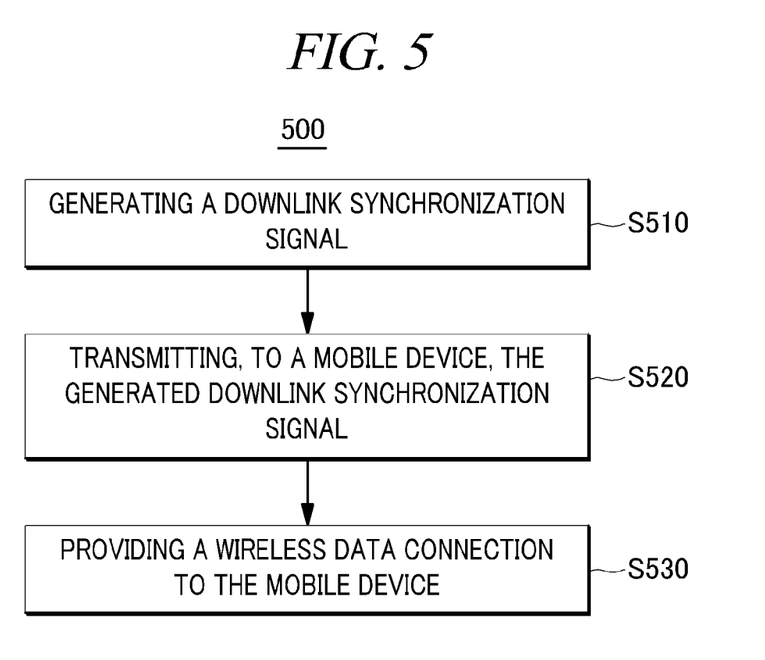
FIG. 5 shows an example flow diagram of a method adapted to transmit, to a mobile device, a downlink synchronization signal through a cellular band in an access point.

FIG. 5 shows an example flow diagram of a method adapted to transmit, to a mobile device, a DL synchronization signal through a cellular band in an access point, arranged in accordance with at least some embodiments described herein. An example method 500 in FIG. 5 may be implemented using, for example, access point 130 described with reference to FIG. 1 and/or access point described with reference to FIG. 2.

Method 500 may include one or more operations, actions, or functions as illustrated by one or more of blocks S510, S5520, and/or S530. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Method 500 may begin at block S510, "GENERATING A DOWNLINK SYNCHRONIZATION SIGNAL."

At block S510, an access point (such as, for example, signal generator 420 of access point 400 in FIG. 4) may generate a DL synchronization signal including information regarding the access point. In some examples, the information regarding the access point may be configured to enable the mobile device to connect to the access point may include an indication of presence of the access point and/or connection information, such as, for example, a MAC address of the access point, a service set identifier (SSID), information about at least one frequency band for wireless communication, at least one wireless communication channel number of the access point, and/or others. Block S510 may be followed by block S520, "TRANSMITTING, TO A MOBILE DEVICE, THE GENERATED DOWNLINK SYNCHRONIZATION SIGNAL."

At block S520, the access point (such as, for example, transmitter 440 of access point 400 in FIG. 4) may transmit the generated DL synchronization signal to the mobile device through a cellular band. In some embodiments, the method may further include synchronizing the generated DL synchronization signal with a signal (such as, for example, a DL synchronization signal) transmitted from a base station. Block S520 may be followed by block S530, "PROVIDING A WIRELESS DATA CONNECTION TO THE MOBILE DEVICE."

At block S530, the access point (such as, for example, wireless network adaptor 460 of access point 400 in FIG. 4) may provide the mobile device with a wireless data connection through a data communication band such as, for example, a Wi-Fi band. The Wi-Fi band may include, but not limited thereto, an ISM band and/or a UNII band and/or other band(s). In some examples, the access point may perform an active scan procedure, in which the access point may receive a probe request signal from the mobile device and transmit a probe response signal in response to the received probe request signal. In some other examples, the access point may perform a passive scan procedure, in which the access point may transmit a beacon signal to the mobile device.

In light of the present disclosure, for this and other methods disclosed herein, the functions and operations performed in the methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

Figure 6:
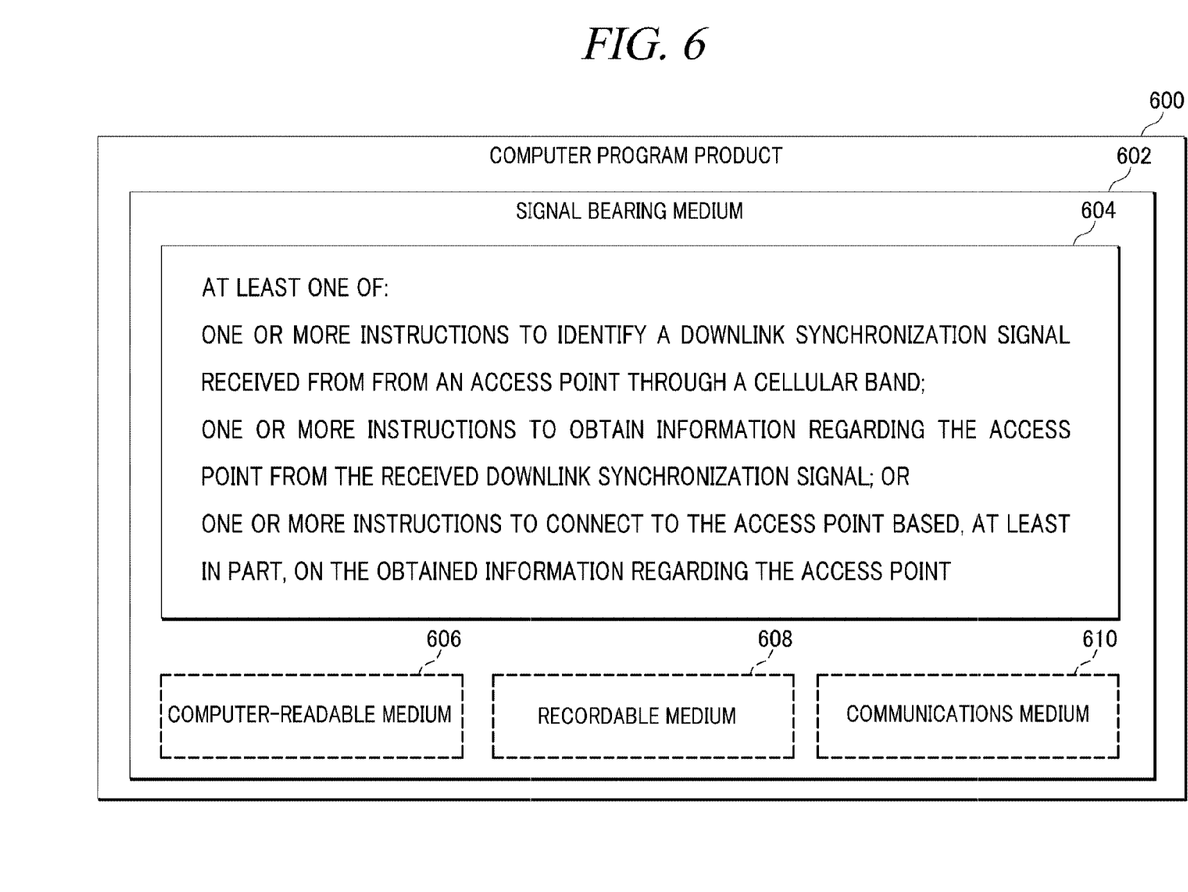
FIG. 6 illustrates a computer program product that can be utilized to connect to an access point based on a downlink synchronization signal received through a cellular band in a mobile device.

FIG. 6 illustrates a computer program product that can be utilized to connect to an access point based on a DL synchronization signal received through a cellular band in a mobile device. Computer program product 600 may include a signal bearing medium 602. Signal bearing medium 602 may include one or more instructions 604 that, in response to execution by, for example, a processor may provide the functionality and features described above with respect to FIGS. 2 to 3. By way of example, instructions 604 may include at least one of: one or more instructions to identify a DL synchronization signal received from an access point through a cellular band; one or more instructions to obtain information regarding the access point from the received DL synchronization signal; or one or more instructions to connect to the access point based, at least in part, on the obtained information regarding the access point. Thus, for example, referring to FIG. 1 or FIG. 2, mobile device 140 or mobile device 200 may undertake one or more of the blocks shown in FIG. 3 in response to instructions 604.

In some implementations, signal bearing medium 602 may encompass a non-transitory computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, a computer program product 600 may be conveyed to one or more modules of mobile device 140 or mobile device 200 by an RF signal bearing medium 602, where the signal bearing medium 602 is conveyed by a wireless communications medium 610 (e.g., a wireless communications medium conforming with the IEEE 802.11 standard).

Figure 7:
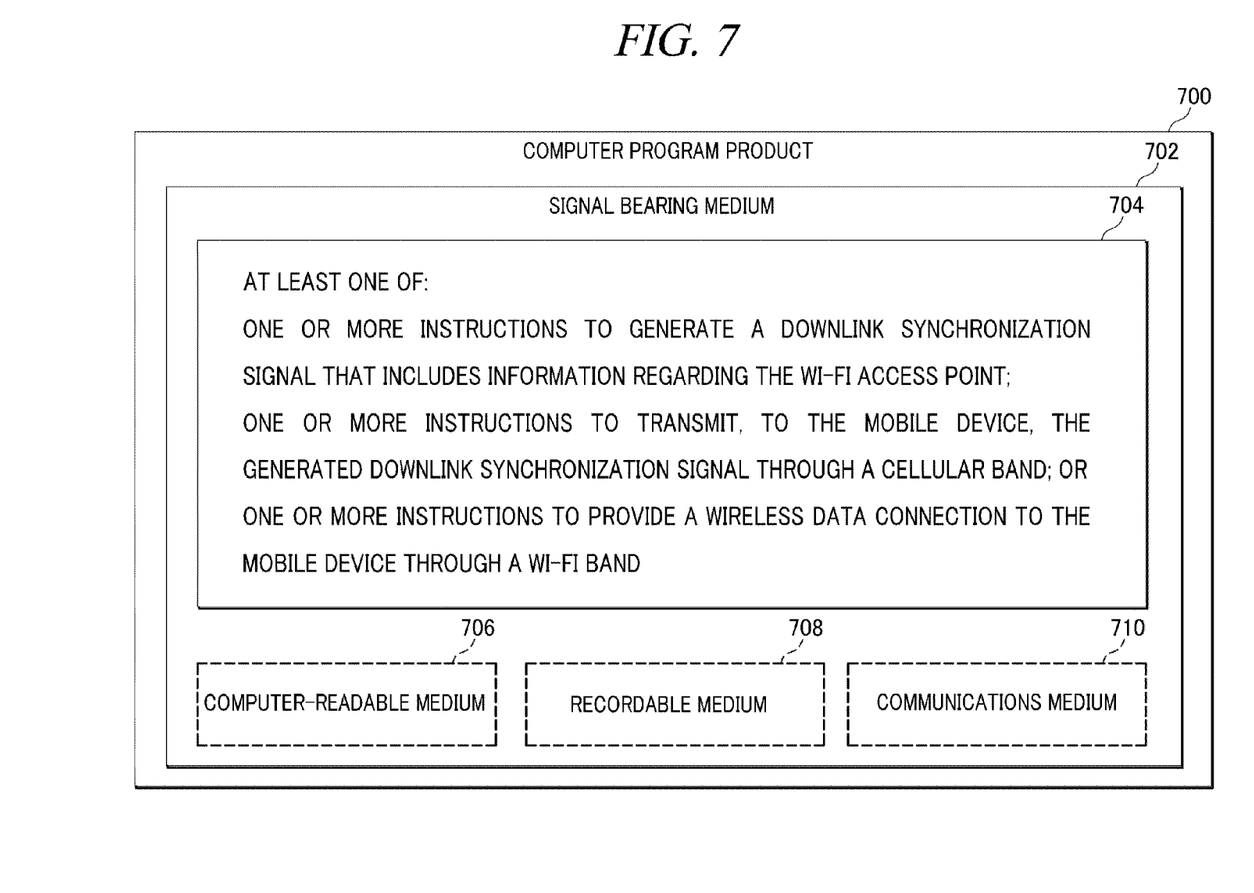
FIG. 7 illustrates another computer program product that can be utilized to transmit a downlink synchronization signal through a cellular band in an access point.

FIG. 7 illustrates another computer program product that can be utilized to transmit a DL synchronization signal through a cellular band in an access point, in accordance with at least some embodiments described herein. Computer program product 700 may include a signal bearing medium 702. Signal bearing medium 702 may include one or more instructions 704 that, in response to execution by, for example, a processor may provide the functionality and features described above with respect to FIGS. 4 to 5. By way of example, instructions 704 may include at least one of: one or more instructions to generate a DL synchronization signal that includes information regarding the Wi-Fi access point; one or more instructions to transmit, to the mobile device, the generated DL synchronization signal through a cellular band; or one or more instructions to provide a wireless data connection to the mobile device through a Wi-Fi band. Thus, for example, referring to FIG. 1 or FIG. 4, access point 130 or access point 400 may undertake one or more of the blocks shown in FIG. 5 in response to instructions 704.

In some implementations, signal bearing medium 702 may encompass a non-transitory computer-readable medium 706, such as, but not limited to, a hard disk drive (HDD), a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, a computer program product 700 may be conveyed to one or more modules of access point 130 or access point 400 by an RF signal bearing medium 702, where the signal bearing medium 702 is conveyed by a wireless communications medium 710 (e.g., a wireless communications medium conforming with the IEEE 802.11 standard).

Figure 8:
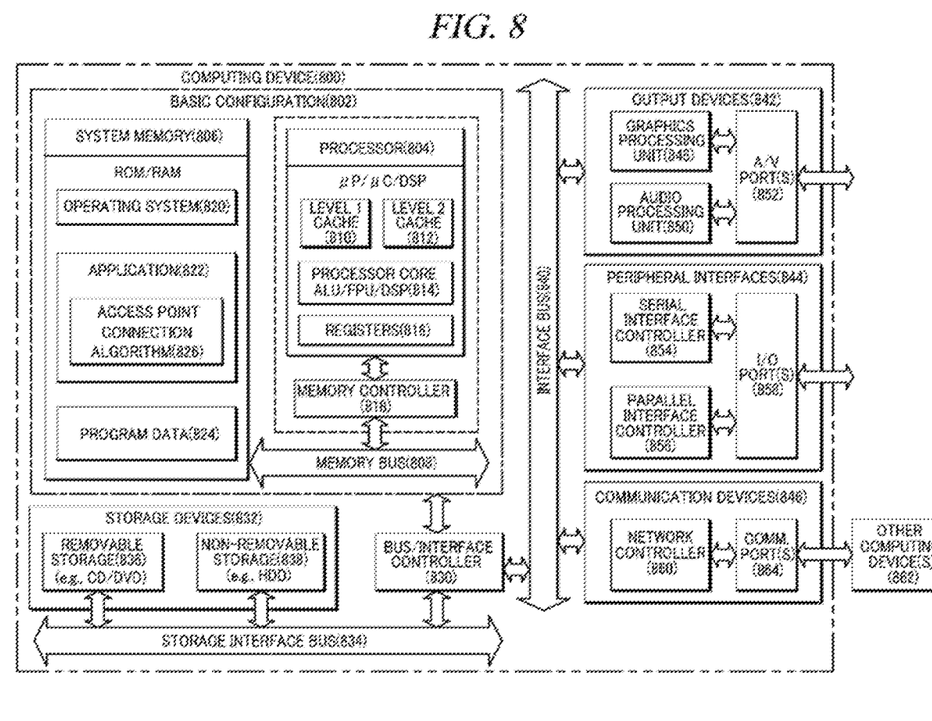
FIG. 8 shows a block diagram of an example computing device that can be configured to connect to an access point in a wireless communication system, all arranged in accordance with at least some embodiments described herein.

FIG. 8 shows a block diagram illustrating an example computing device 800 that can be configured to connect to an access point in a wireless communication system, arranged in accordance with at least some embodiments described herein. For instance, computing device 800 may be implemented in a mobile device, such as mobile device 140 and/or mobile device 200 described above.

In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, an application 822, and program data 824.

Application 822 may include an access point connection algorithm 826 that may be arranged to perform the functions and operations as described herein including the actions described with respect to mobile device 140 as shown in FIG. 1 or mobile device 200 as shown in FIG. 2 or including the actions described with respect to the flow charts shown in FIG. 3. Program data 824 may include any data that may be useful for providing the access point connection scheme as is described herein. In some examples, operating system 820 and/or application 822 may be arranged to operate with program data 824 such that the access point connection scheme as described herein may be performed.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only, and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a mobile device, the method comprising:
   receiving a first downlink synchronization signal from a base station through a cellular band;
   receiving a second downlink synchronization signal from an access point through the cellular band;
   obtaining information regarding the access point from the received second downlink synchronization signal; and
   connecting to the access point based, at least in part, on the obtained information regarding the access point, wherein the received second downlink synchronization signal is synchronized with the first downlink synchronization signal, wherein obtaining the information includes detecting a signature included in a portion of the received second downlink synchronization signal, wherein the portion of the received second downlink synchronization signal corresponds to a cell ID section of the first downlink synchronization signal, and wherein the signature is different from a cell ID included in the cell ID section of the first downlink synchronization signal.

2. The method of claim 1, wherein receiving the second downlink synchronization signal from the access point includes receiving the second downlink synchronization signal from a wireless fidelity (Wi-Fi) access point.

3. The method of claim 1, wherein obtaining the information regarding the access point includes
   decoding the detected signature to obtain the information regarding the access point.

4. The method of claim 1, wherein obtaining the information regarding the access point includes obtaining information regarding at least one of an indication of presence of the access point or connection information to connect to the access point.

5. The method of claim 4, wherein obtaining the information regarding the connection information includes obtaining information regarding at least one of a service set identifier (SSID), at least one frequency band for wireless communication, at least one wireless communication channel number or a media access control (MAC) address of the access point.

6. The method of claim 1, wherein connecting to the access point includes activating a data communication module of the mobile device.

7. The method of claim 6, wherein activating the data communication module includes activating a Wi-Fi module that is configured to operate at an industrial, scientific and medical (ISM) band and/or an unlicensed national information infrastructure (UNIT) band.

8. The method of claim 7, wherein connecting to the access point includes performing a Wi-Fi scan procedure by the Wi-Fi module.

9. The method of claim 8, wherein performing the Wi-Fi scan procedure includes at least one of:
   transmitting a probe request signal to the access point; or
   receiving a beacon signal from the access point.

10. A mobile device, comprising:
    a receiver configured to receive a first downlink synchronization signal from a base station through a cellular band based upon a first range between the receiver and the base station, and a second downlink synchronization signal from an access point through the cellular band based upon a second range between the receiver and the access point;
    a decoder coupled to the receiver and configured to decode a signature included in the received second downlink synchronization signal to obtain information regarding the access point, wherein the signature corresponds to a cell ID of the first downlink synchronization signal, and wherein the signature is different from the cell ID of the first downlink synchronization signal; and a data communication module coupled to the decoder and configured to connect to the access point based, at least in part, on the obtained information regarding the access point, wherein the received second downlink synchronization signal is synchronized with the first downlink synchronization signal, and wherein the second range is included in the first range.

11. The mobile device of claim 10, further comprising:
a switch coupled to the data communication module and configured to activate the data communication module in response to the obtained information regarding the access point.

12. The mobile device of claim 10, wherein the access point includes a wireless fidelity (Wi-Fi) access point, and wherein the data communication module includes a Wi-Fi module that is configured to operate at an industrial, scientific and medical (ISM) band and/or an unlicensed national information infrastructure (UNII) band.

13. The mobile device of claim 12, wherein the Wi-Fi module is configured to perform a Wi-Fi scan procedure.

14. The mobile device of claim 13, wherein to perform the Wi-Fi scan procedure, the Wi-Fi module is configured to perform at least one of:
transmit a probe request signal to the access point; or
receive a beacon signal from the access point.

15. A wireless fidelity (Wi-Fi) access point to provide wireless data communication to a mobile device, wherein a base station transmits a first downlink synchronization signal, the Wi-Fi access point comprising:
a signal generator configured to generate a second downlink synchronization signal that includes information regarding the Wi-Fi access point, wherein a signature is included in the generated second downlink synchronization signal, wherein the signature corresponds to a cell ID of the first downlink synchronization signal, and wherein the signature is different from the cell ID of the first downlink synchronization signal;
a transmitter coupled to the signal generator and configured to transmit, to the mobile device, the generated second downlink synchronization signal through a cellular band; and
a wireless network adapter coupled to the transmitter and configured to provide a wireless data connection to the mobile device through a Wi-Fi band different from the cellular band, wherein the generated second downlink synchronization signal is synchronized with the first downlink synchronization signal from the base station through the cellular band.

16. The Wi-Fi access point of claim 15, wherein the information regarding the Wi-Fi access point includes at least one of: an indication of presence of the Wi-Fi access point, a service set identifier (SSID), information about at least one Wi-Fi band, at least one Wi-Fi channel number, or a media access control (MAC) address of the Wi-Fi access point.

17. The Wi-Fi access point of claim 15, wherein the wireless network adapter is further configured to receive a probe request signal from the mobile device and to transmit a probe response signal in response to the received probe request signal.

18. A method performed under control of a wireless fidelity (Wi-Fi) access point to provide wireless data communication to a mobile device, wherein a base station transmits a first downlink synchronization signal, the method comprising:
generating a second downlink synchronization signal that includes information regarding the Wi-Fi access point, wherein a signature is included in the generated second downlink synchronization signal, wherein the signature corresponds to a cell ID of the first downlink synchronization signal, and wherein the signature is different from the cell ID of the first downlink synchronization signal;
transmitting, to the mobile device, the generated second downlink synchronization signal through a cellular band;
providing a wireless data connection to the mobile device through a Wi-Fi band different from the cellular band; and
synchronizing the generated second downlink synchronization signal with the first downlink synchronization signal from the base station through the cellular band.

19. The method of claim 18, wherein the information regarding the Wi-Fi access point includes at least one of an indication of presence of the Wi-Fi access point, a service set identifier (SSID), information about at least one Wi-Fi band, at least one Wi-Fi channel number, or a media access control (MAC) address of the Wi-Fi access point.

20. The method of claim 18, further comprising:
receiving a probe request signal from the mobile device; and
transmitting a probe response signal in response to the received probe request signal.

* * * * *

UNITED STATES PATENT AND TRADEMARK OFFICE
CERTIFICATE OF CORRECTION

PATENT NO. : 9,730,170 B2  
APPLICATION NO. : 14/298973  
DATED : August 8, 2017  
INVENTOR(S) : Kwak et al.

Page 1 of 1

It is certified that error appears in the above-identified patent and that said Letters Patent is hereby corrected as shown below:

In the Specification

In Column 8, Line 20, delete "S5520," and insert -- S520, --, therefor.

In the Claims

In Column 14, Line 35, in Claim 5, delete "number or" and insert -- number, or --, therefor.

In Column 14, Line 44, in Claim 7, delete "(UNIT)" and insert -- (UNII) --, therefor.

Signed and Sealed this  
Sixteenth Day of January, 2018

Joseph Matal  
*Performing the Functions and Duties of the*  
*Under Secretary of Commerce for Intellectual Property and*  
*Director of the United States Patent and Trademark Office*